J. F. O'CONNOR.
FRICTION DRAFT RIGGING.
APPLICATION FILED FEB. 1, 1911.
1,060,114.
Patented Apr. 29, 1913.
2 SHEETS—SHEET 1.
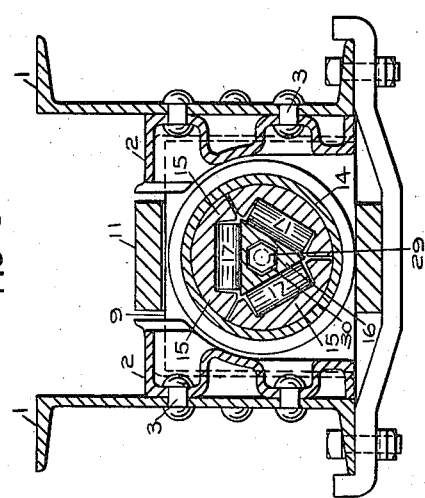
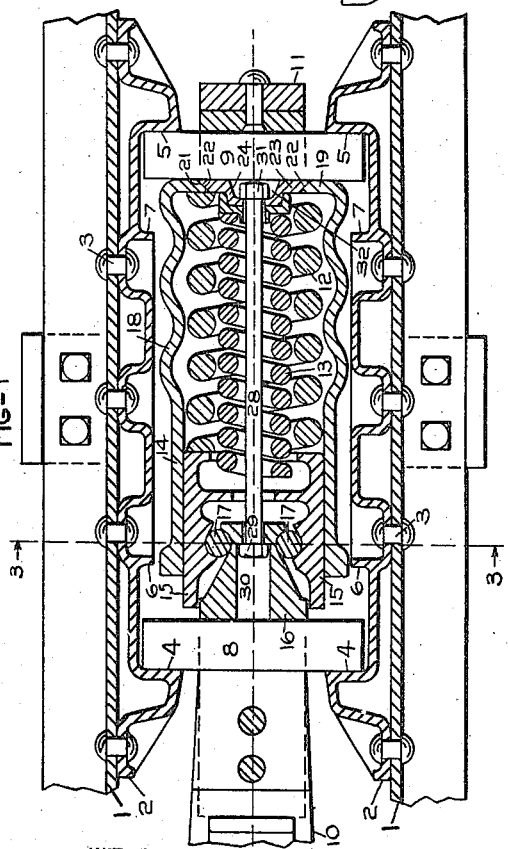
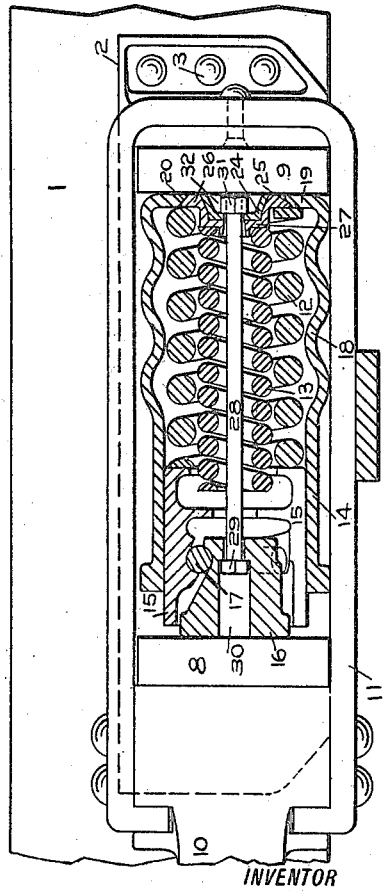
WITNESSES:
Calvin B. Patch
Esther Abrams.
INVENTOR
John F. O'Connor,
BY
HIS ATTORNEYS J. F. O'CONNOR.
FRICTION DRAFT RIGGING.
APPLICATION FILED FEB. 1, 1911.
1,060,114.
Patented Apr. 29, 1913.
2 SHEETS—SHEET 2.
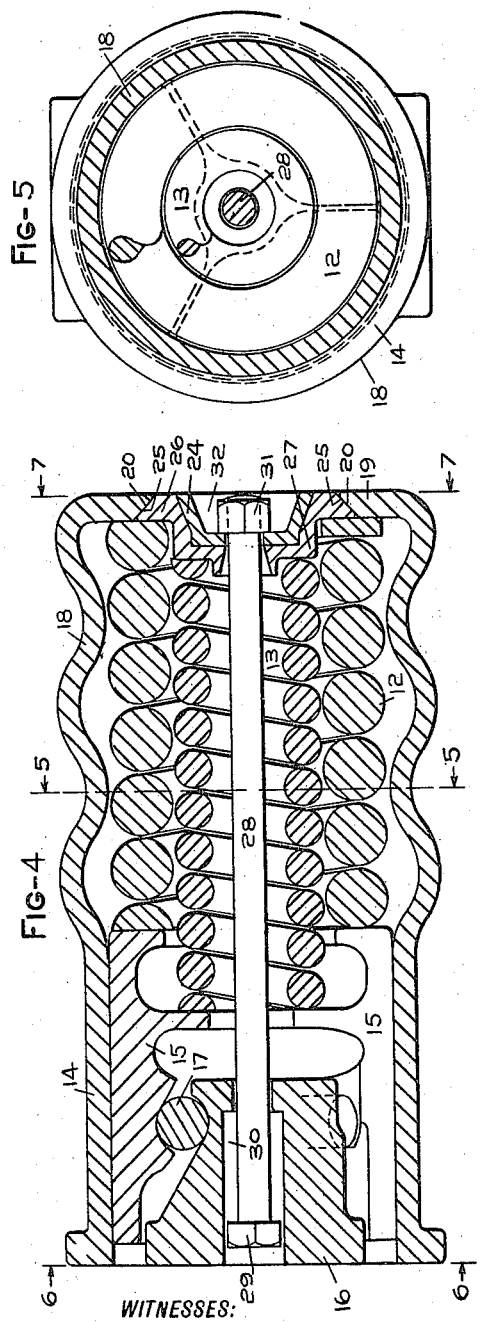
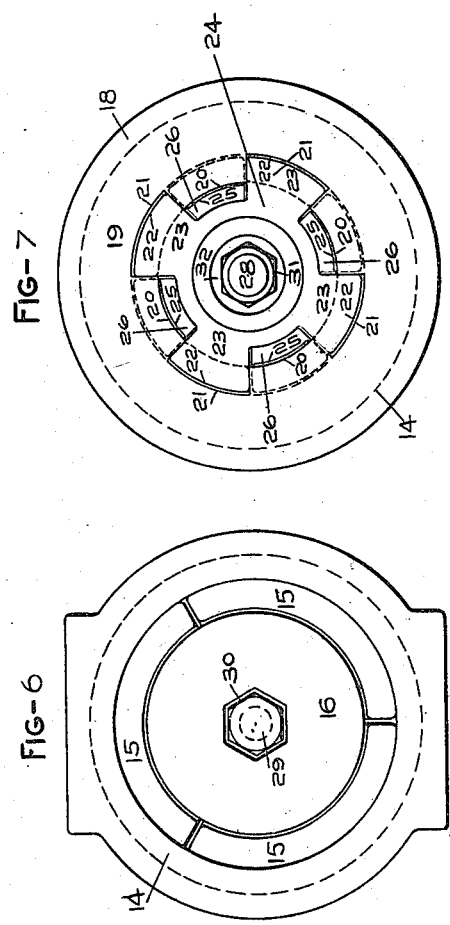
WITNESSES:
Calvin B. Patch
Esther Abrams.
INVENTOR
John F. O'Connor.
BY Munday, Evarts,
Adcock & Clarke
HIS ATTORNEYS

UNITED STATES PATENT OFFICE.

JOHN F. O'CONNOR, OF CHICAGO, ILLINOIS, ASSIGNOR TO WILLIAM H. MINER, OF CHICAGO, ILLINOIS.

FRICTION DRAFT-RIGGING.

1,060,114.

Specification of Letters Patent. Patented Apr. 29, 1913.

Application filed February 1, 1911. Serial No. 605,846.

*To all whom it may concern:*

Be it known that I, JOHN F. O'CONNOR, a citizen of the United States, residing in Chicago, in the county of Cook and State of Illinois, have invented a new and useful Improvement in Friction Draft-Rigging, of which the following is a specification.

My invention relates to improvements in friction draft rigging for railway cars.

The object of my invention is to provide an improved construction of friction draft rigging which will obviate or very greatly reduce the danger of extremely heavy shocks or blows causing shearing of the rivets which unite the stop members to the draft sills of the car after the friction cushioning mechanism has been fully compressed. This important object or result I practically accomplish by providing the friction shell, and herein my invention primarily consists, with a series of transverse corrugations at the portion thereof which surrounds the spring at the rear of the friction shoes, thus giving a certain degree of elasticity or yield to the friction shell itself, which I find by experiment operates to very effectually prevent shearing of the rivets connecting the stop members with the draft sills of the car under heavy shocks or blows which would otherwise cause the shearing of the rivets, the friction shell being of malleable iron and thus transversely corrugated has a certain extent of longitudinal compression, yield or elasticity under extremely heavy shocks or blows to an extent ordinarily of approximately a quarter of an inch without the metal receiving any permanent set, and thus acts to effectually prevent shearing of the rivets which would otherwise occur if the shell were absolutely stiff and rigid against longitudinal compression.

My invention further consists in the novel construction and novel combination of parts and devices herein shown and described and more particularly specified in the claims.

In the accompanying drawing forming a part of this specification, Figure 1 is a plan view, partly in horizontal section of a friction draft rigging embodying my invention. Fig. 2 is a side elevation, partly in vertical, longitudinal section. Fig. 3 is a cross section on line 3—3 of Fig. 1. Fig. 4 is a detail, longitudinal section of the friction shell and contained parts, showing the gear compressed solid. Fig. 5 is a cross section on line 5—5 of Fig. 4. Figs. 6 and 7 are end elevations, looking from the lines 6—6, 7—7 of Fig. 4.

In the drawing, 1 represents the center or other draft sills of a railway car, 2 the stop members secured thereto by rivets 3 in the usual manner, the stop members having front and rear stops 4, 5 and limiting stops 6, 7 for the followers 8, 9 to engage.

The numeral 10 denotes the draw-bar, 11 the draft yoke, 12, 13 the springs, 14 a longitudinally movable friction shell, 15 friction shoes within the shell, preferably three in number, 16 the wedge, preferably three faced and 17 anti-friction rollers interposed between the inclined faces of the wedge and friction shoes.

To give the friction shell, which is of malleable iron, a certain degree of longitudinal yield or elasticity under extremely heavy blows and prevent it from acting as a rigid and unyielding stop against further movement of the draw-bar by its engagement with the follower after the springs have been fully compressed and to prevent consequent danger of shearing the rivets 3, I provide the friction shell at the portion thereof surrounding the springs to the rear of the friction shoes with a plurality of transverse circumferential corrugations 18. This gives the friction shell a certain degree of longitudinal yield or elasticity, sufficient to practically protect the rivets from danger of shearing under extremely heavy blows to which the draft rigging is sometimes subjected in practical use.

At its rear end, the friction shell is formed with an inturned flange or rim 19 which is furnished with an inner set of bevel faces 20 and an outer set of bevel faces 21, the inner and outer sets of bevel faces alternating with each other. The outer set of bevel faces 21 are engaged by the corresponding bevel faces 22 on the arms 23 of the outer cap 24, and the inner set of bevel faces 20 are engaged by corresponding bevel faces 25 on the radial arms or lugs 26 of the inner cap 27. The inner cap 27 is thus prevented from moving longitudinally outward through the open end of the friction shell, while the outer cap 24 is prevented from moving longitudinally inward through the friction shell. The double or inner and outer caps 24, 27 which close the opening in the rear end of the friction shell, thus together prevent movement in both directions, the inner cap 27 preventing outward movement under thrust of the small or nested spring 13 which bears against said inner cap, and the outer cap 24 resisting inward pull of the connecting rod 28 which bears against the outer cap. The connecting rod 28 has a head 29 at one end which fits in a recess 30 of the wedge 16 and a nut 31 at its rear end which fits in the recess 32 of the outer cap 24.

I claim:—

1. In a friction draft rigging, a friction shell having an interior friction face for engagement with friction shoes and a circumferential corrugated portion to the rear thereof to give it a degree of longitudinal compressibility to prevent danger of shearing the rivets which connect the stop members with the draft members under heavy blows, substantially as specified.

2. In a friction draft rigging, the combination with a draw-bar, draft yoke, stop members and followers, of a friction shell, friction shoes, anti-friction rollers and wedge within the shell, springs reacting at one end against the friction shell and at their other end against the friction shoes, said friction shell having at its rear end inner and outer caps, the inner one engaging the friction shell on the inside to prevent outward movement, and the outer cap engaging the friction shell on the outside to prevent inward movement, and a connecting rod extending between the wedge and the outer cap, one of the springs bearing at one end against said inner cap, said inner and outer caps having oppositely beveled faces for engagement with alternately arranged and correspondingly beveled faces on the friction shell with which said friction shell is provided at its rear end, substantially as specified.

JOHN F. O'CONNOR.

Witnesses:
 PEARL ABRAMS,
 ETHEL C. BARRETT.

Copies of this patent may be obtained for five cents each, by addressing the "Commissioner of Patents, Washington, D. C."